United States Patent [19]

Kawabata et al.

[11] Patent Number: 5,422,526

[45] Date of Patent: Jun. 6, 1995

[54] MOTOR COIL STRUCTURE

[75] Inventors: Yasutomo Kawabata, Aichi; Kaoru Kubo, Nishikamo; Tetsuya Miura, Toyota, all of Japan

[73] Assignee: Toyota Jidosha Kabushiki Kaisha, Tokyo, Japan

[21] Appl. No.: 174,918

[22] Filed: Dec. 29, 1993

[30] Foreign Application Priority Data

Jan. 7, 1993 [JP] Japan .................................. 5-001227

[51] Int. Cl.⁶ .............................................. H02K 3/04
[52] U.S. Cl. .................................... 310/201; 310/260
[58] Field of Search .............................. 310/201–209, 310/260, 270, 71

[56] References Cited

U.S. PATENT DOCUMENTS

| | | | |
|---|---|---|---|
| 335,105 | 2/1886 | Boissier | 310/201 |
| 589,839 | 9/1897 | Lamme | 310/201 |
| 753,278 | 3/1904 | Lindeman | 310/201 |
| 2,085,099 | 6/1937 | Jones | 310/208 X |
| 3,176,176 | 3/1965 | Willyoung | 310/270 X |
| 4,028,572 | 6/1977 | Baltisberger | 310/201 |
| 4,321,497 | 3/1982 | Long | 310/201 X |
| 4,367,425 | 1/1983 | Mendelsohn et al. | 310/260 |
| 4,543,503 | 9/1985 | Kaminski et al. | 310/270 X |
| 5,196,752 | 3/1993 | Palma | 310/201 X |
| 5,270,598 | 12/1993 | Holly, III et al. | 310/71 |

FOREIGN PATENT DOCUMENTS

| | | | |
|---|---|---|---|
| 1005611 | 4/1957 | Germany | 310/201 |
| 56-118578 | 9/1981 | Japan . | |
| 57-89345 | 6/1982 | Japan . | |
| 64-16150 | 1/1989 | Japan . | |

*Primary Examiner*—Mark O. Budd
*Attorney, Agent, or Firm*—Kenyon & Kenyon

[57] ABSTRACT

A motor coil structure has a lamination of in-slot coils incorporated into slots in a stator core and inter-slot connecting wires individually connecting to the end faces of the in-slot coils. Each of the inter-slot connecting wires is in the form of a bar such that the in-slot coils received in two different slots spaced away from each other by slots equal in number to $n-1$ (where n is the number of phases). Since the space factor depends on the lamination of in-slot coils in the slot, any clearance in the slot can be eliminated to improve the space factor compared with a motor coil structure in which a coil is formed by binding and winding a plurality of wires.

16 Claims, 10 Drawing Sheets

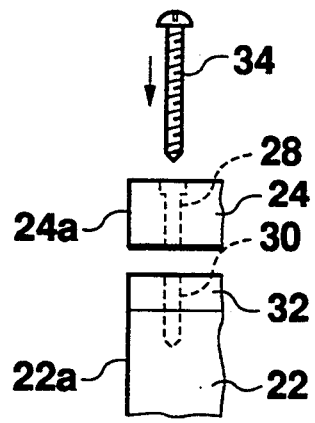
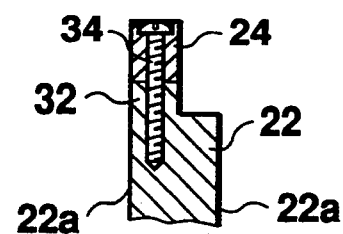
Fig. 3A  Fig. 3B
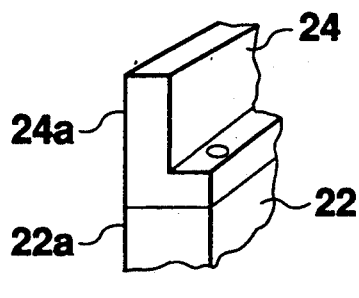
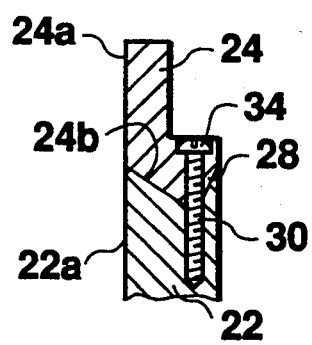
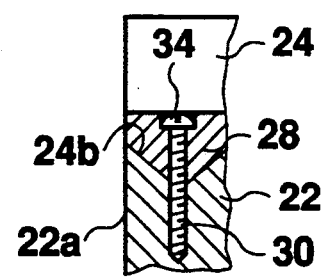
Fig. 4A  Fig. 4B  Fig. 4C

MOTOR COIL STRUCTURE

BACKGROUND OF THE INVENTION

1. Field of the Invention

The present invention relates to a motor coil structure and more particularly to means for improving a space factor in a coil winding.

2. Description of the Prior Art

FIGS. 9 to 11 show a motor coil structure according to the prior art. For simplicity, the stator core 10 and rotor 16 are linearly drawn in these figures, but they are actually of cylindrical configuration.

The motor is a three-phase motor of a structure including three coils 12-U, 12-V and 12-W fixedly mounted on the stator core 10. To fix these coils 12-U, 12-V and 12-W, the stator core 10 is formed with a predetermined number of slots 14-U, 14-V and 14-W. Each of the coils 12-U, 12-V and 12-W is formed by a plurality of bound conductive wires. Each coil 12-U, 12-V or 12-W is wound around the core through the corresponding one of the slots 14-U, 14-V and 14-W as shown in FIGS. 10 and 11 and the end face of the stator core 10 is exposed as shown in FIG. 9. The portion of each coil 12-U, 12-V or 12-W wound around the end of the stator core 10 and spanned between the slots 14-U, 14-V, and 14-W is known as an interslot connecting wire.

As a three-phase current is supplied through the coils 12-U, 12-V and 12-W, a three-phase alternating magnetic field is produced. With an inner rotor structure, a rotor 16 is disposed within a cylinder-shaped space which is formed inside of the stator core 10. However, an outer rotor structure provides a rotor 16 disposed outside of the stator core 10. The rotor 16 includes permanent magnets 18 mounted thereon opposite to the stator core 10. When the three-phase alternating magnetic field is produced by exciting the coils 12-U, 12-V and 12-W, a torque is created in the rotor 16 to rotate the rotor 16.

In general, the size of the coil structure is evaluated by a space factor. The space factor is defined as a rate of occupying a cross-section of a corresponding slot 14.

On the other hand, in the prior art described above, the coils 12 are wound around the stator core 10 after the coils 12 are tied up in bundles. Although this manufacturing process makes the handling of the coils 12 easy and thus the manufacturing cost cheap, the process provides a coil structure with a space factor equal to or less than 50%. In other words, the coil structure and its manufacturing process have a problem in that the space factor is small.

In addition, because the interslot connecting wires are parts of the coils 12, the interslot connecting wires become large when the above-described process is used. As a result, the size of the stator core 10 along an axis of the motor becomes large.

To solve these problems, the making of the coils 12 by winding the wires around the stator core 10 without lying them up in bundles is preferable. However, when this process is used, not only are the manual operations to wind each wire around the stator core necessary and thus the manufacturing cost is increased, but also the inductance of each coil 12 becomes incorrect and the quality of the coil structure therefore varies.

SUMMARY OF THE INVENTION

The present invention provides a reduction in the size of the motor and improves the performance thereof.

The present invention additionally provides a reduction in the clearance within the slots to improve the space factor of the motor.

The present invention eliminates the windings of a plurality of wires in the motor so that the motor can be produced with an improvement of the operability and with a reduction of the manufacturing cost.

The present invention additionally provides a decrease in the size of the interslot connecting wire.

The present invention inhibits the error in the inductance and resistance of the coils due to the manual wire winding operation so that the performance of the motor including the efficiency will be improved.

The present invention maintains a better electrical conductivity of the coils.

The present invention accomplishes each of the above features by the use of only a simplified process.

The present invention additionally improves the geometrical accuracy of the coil structure to increase the performance of the motor.

The present invention provides a motor comprising:
a) a core having at least two end faces and a plurality of slots, said slots being formed therein to extend from one end face to the other and parallel to one another,
b) a plurality of in-slot conductors each having two end portions, a given number of in-slot conductors being arranged in each of the slots to be in layers, the in-slot conductors in the same slot being electrically insulated from one another, and
c) inter-slot connecting conductors each having two end portions, the inter-slot connecting conductors being formed separately from the in-slot conductors, each of said inter-slot connecting conductors being located on or adjacent to the corresponding one of the end faces of the core, one end portion of each inter-slot connecting conductor being electrically connected to the end portion of the corresponding in-slot conductor and another end portion of the same inter-slot connecting conductor being electrically connected to the end portion of the other in-slot conductor arranged in a different slot, thereby electrically connecting the in-slot conductors in different slots to one another through the inter-slot connecting conductor.

The present invention also provides a coil structure comprising:
a) a plurality of in-slot conductors each having two end portions and being disposed to form a plurality of laminates, the in-slot conductors defining the same laminate being electrically insulated from one another, and
b) inter-slot connecting conductors each having two end portions, the inter-slot connecting conductors being formed separately from the in-slot conductors, one end portion of each of the inter-slot connecting conductors being electrically connected to the end portions of the in-slot conductors defining one of the laminates with the other end portion thereof being electrically connected to the end portions of the in-slot conductors defining another one of the laminates.

According to the present invention, in each of the slots a plurality of in-slot conductors (e.g., formed conductors having the desired configuration) are arranged and laminated in layers. The in-slot conductors arranged in each of the slots are individually connected to the respective in-slot conductors in another slot through the inter-slot connecting conductors. With an n-phase motor, for example, the in-slot conductors in a slot are connected to those in another slot spaced away from the first-mentioned slot by n-1 in number through one inter-slot connecting conductor. The inter-slot connecting conductor is arranged across the direction of laminating the in-slot conductors, that is, in the longitudinal direction of the slot and also located on or adjacent to the end face of the core. In general, a plurality of such inter-slot connecting conductors are placed at predetermined intervals along the aforementioned longititudinal direction. According to the present invention, thus, a coil in each of the phases is defined by the laminated in-slot conductors in the respective slots and the inter-slot connecting conductors individually connecting the associated in-slot conductors with each other.

In other words, the coil in each phase can be formed without binding the conductors. Therefore, no problem will be raised with respect to errors of inductances, fluctuations of output torque of the motor caused by the errors of inductances and others. When a coil in each phase is to be formed, the connection of each of the in-slot conductors with the corresponding inter-slot connecting conductor is only required. This can secure the operability on manufacture and the capability of realizing the automation of the manufacturing process. Since the space factor depends on the laminated structure of in-slot conductors in each slot and the in-slot conductors can be compacted in the slot without clearance in the present invention, the space factor can be improved by reducing the clearance in each slot in comparison with the prior art in which a plurality of bound conductors are used to form a coil in each phase.

Therefore, the present invention can provide a motor which has an improved space factor, which can be produced into a reduced size with a reduced number of manufacturing steps and which can be improved with respect to errors of impedance and others to increase the performance and to secure the operability on manufacturing.

To provide the best space factor, it is preferred that each of the in-slot conductors is formed into a bar-like configuration. This is because the clearance in the slot can completely be eliminated only by setting the wall-thickness of the main body of each in-slot conductor at an appropriate level. At the same time, the two end portions of each in-slot conductor, that is, the portions of that conductor outwardly extending from the slot have their wall-thickness smaller than that of the main conductor body. The electrical connection between each of the in-slot conductors and the inter-slot connecting conductor can be accomplished by using any suitable screw means at the end portions. If the end portions of the inter-slot connecting conductor are considered to be an L-shaped cross-section, the in-slot conductor may be electrically connected to the inter-slot connecting conductor through any suitable screw at the shorter leg of the "L". In such a case, one leg of the L-shaped configuration in the inter-slot connecting conductor may be tapered to enlarge the electric contact area between the in-slot conductor and the inter-slot connecting conductor for making the electrical connection therebetween better. If the cross-sectional area of each of the in-slot conductors is selected to be equal to that of the inter-slot connecting conductor, the resistance of the coil becomes uniform all over the coil.

It is further preferred that a gap is formed between any pair of adjacent inter-slot connecting conductors. This is convenient to wind the inter-slot connecting conductor in any other phase around the core through the gaps. In a preferred embodiment of the present invention, each inter-slot connecting conductor is formed of a curved bar-shaped configuration.

In this connection, the coil structure of the present invention may be applied to either of the stator or the rotor.

BRIEF DESCRIPTION OF THE DRAWINGS

FIG. 3A is an exploded front view of a structure connecting the inter-slot connecting wire and the in-slot coils in the embodiment of FIG. 1.

FIG. 3B is a cross-sectional view showing the structure of FIG. 3A after connection.

FIG. 4A is a perspective view of another structure connecting the inter-slot connecting wire and the in-slot coils in the embodiment of FIG. 1.

FIG. 4B is a cross-sectional view of the structure shown in FIG. 4A, taken along a plane perpendicular to the inter-slot connecting wire.

FIG. 4C is a cross-sectional view of the structure of FIG. 4A, taken along a plane parallel to the inter-slot connecting wire.

DETAILED DESCRIPTION

Figure 9:
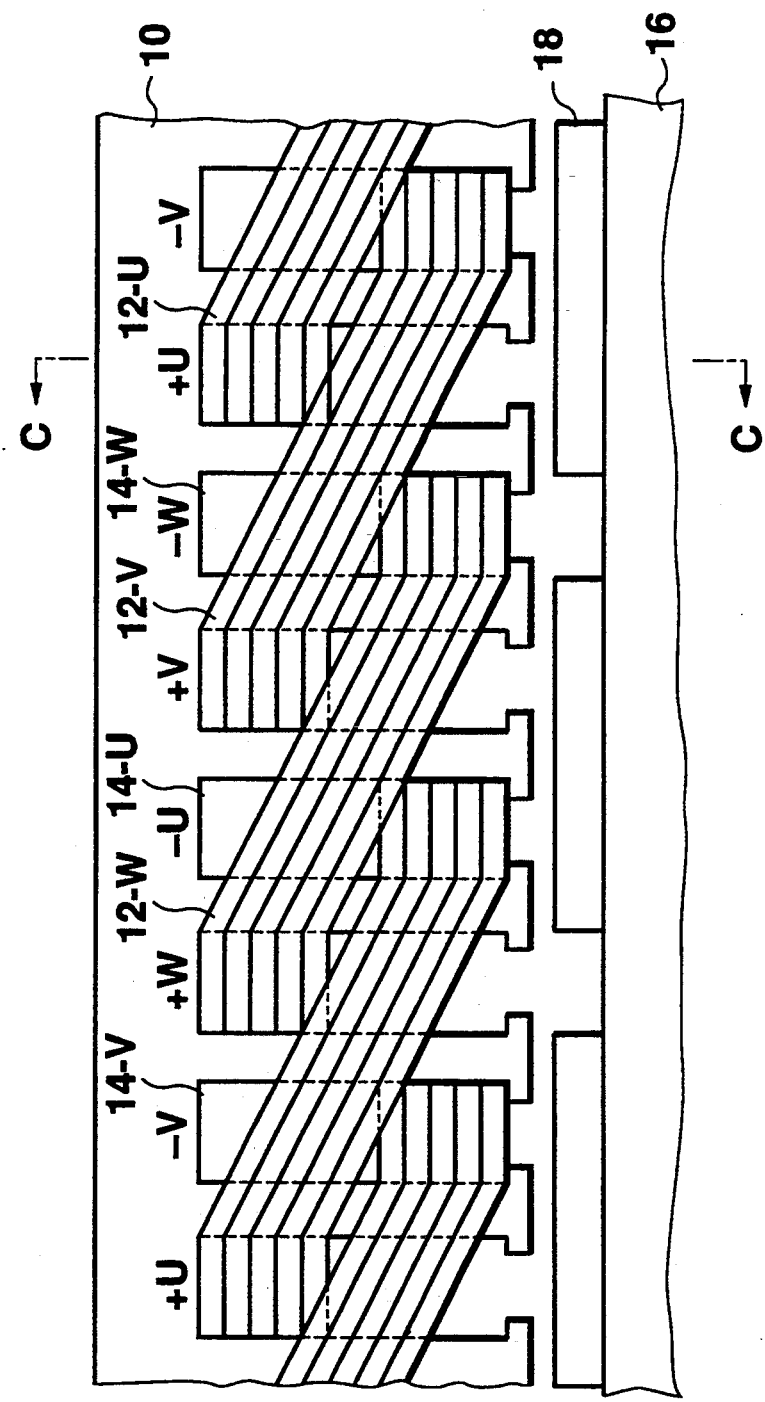
FIG. 9 is a diagrammatic view showing the inter-slot connecting wire structure in a motor coil structure constructed in accordance with the prior art.
Figure 10:
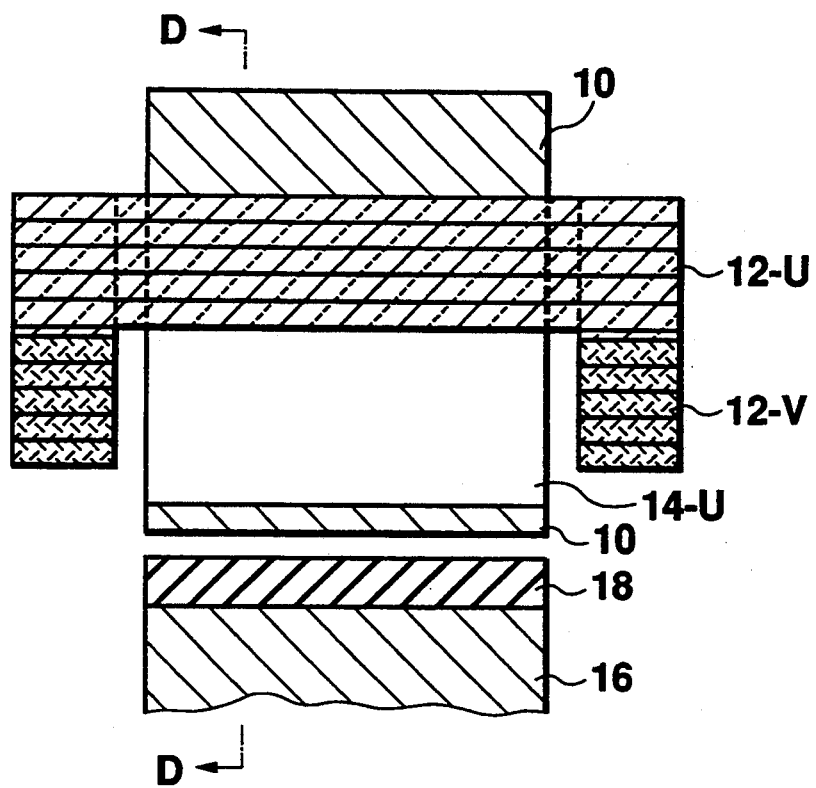
FIG. 10 is a cross-sectional view showing the state of the slots occupied by the coils in the prior art, taken along a line C—C in FIG. 9.
Figure 11:
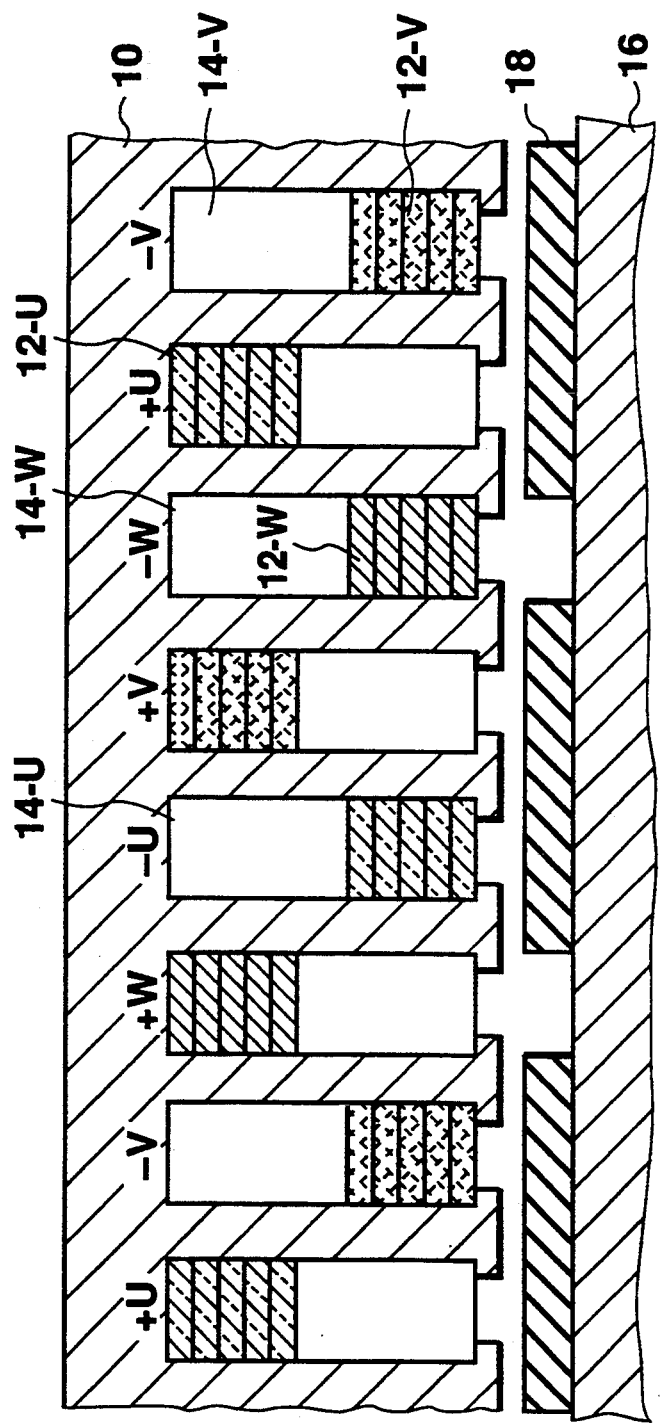
FIG. 11 is a cross-sectional view similar to FIG. 10, taken along a line D—D in FIG. 9.

Reference will be made to some preferred embodiments of the present invention, in which parts similar to those of the prior art shown in FIGS. 9 to 11 are denoted by similar reference numerals.

Figure 1:
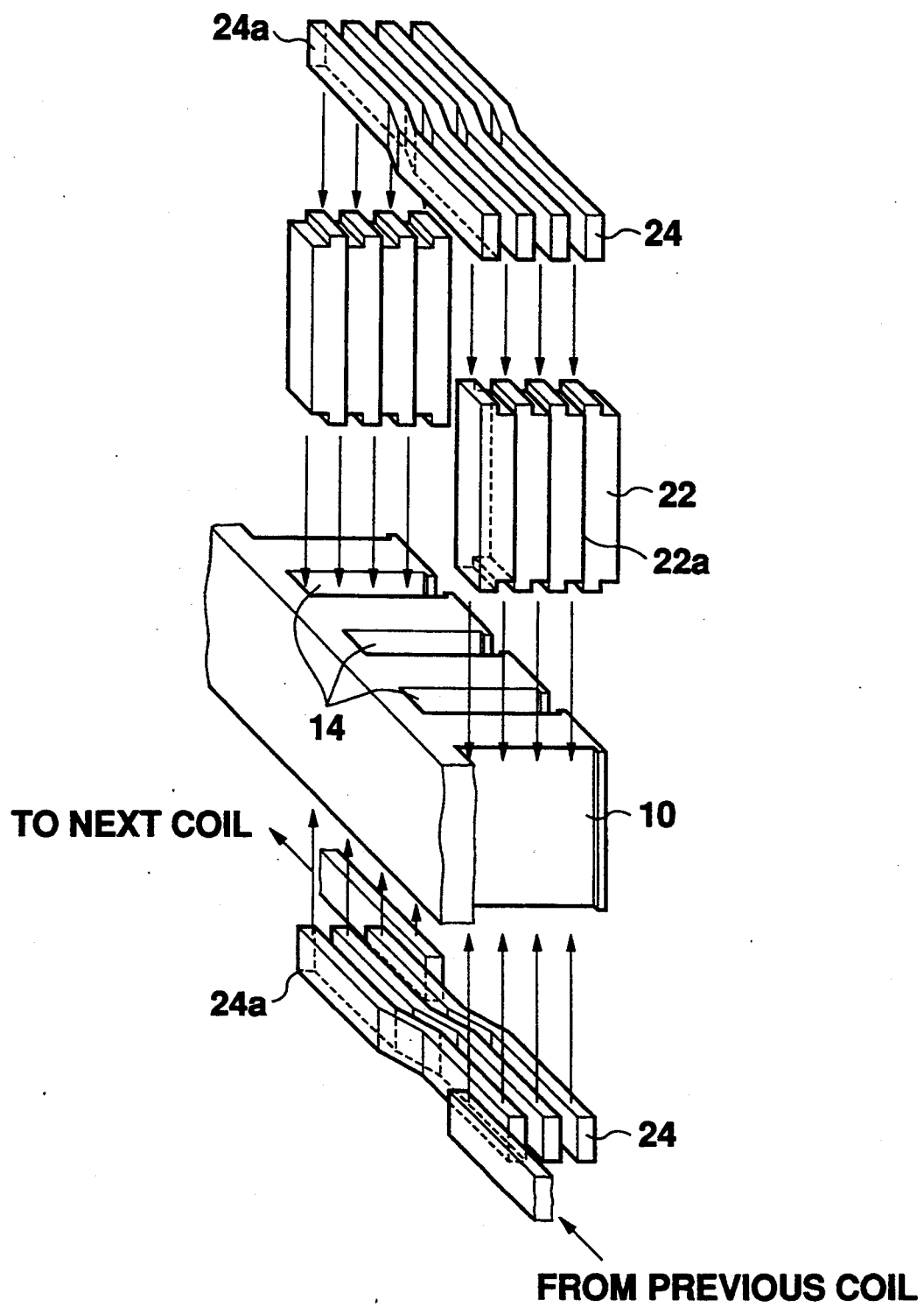
FIG. 1 is an exploded perspective view of one embodiment of a motor coil structure constructed in accordance with the present invention, particularly showing the relationship between a coil in one phase and slots.
Figure 2:
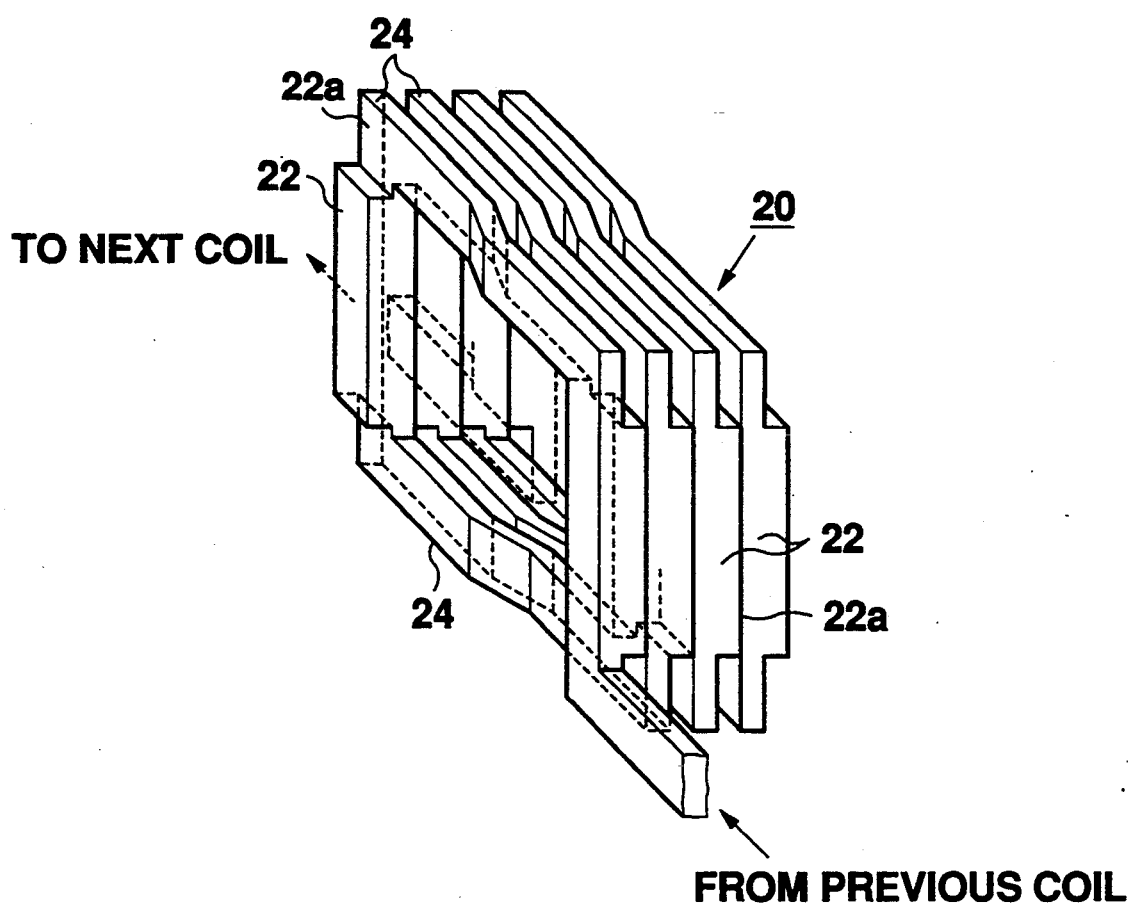
FIG. 2 is a perspective view showing the coil configuration of one phase in the embodiment of the present invention shown in FIG. 1.

FIGS. 1 and 2 illustrate one embodiment of a motor coil structure constructed in accordance with the present invention with respect to a single phase. The coil structure 20 is formed by in-slot coils 22, each of which is a formed coil, and inter-slot connecting wires 24.

The in-slot coils 22 are laminated in the corresponding slot 14. The lamination direction of the in-slot coils 22 is the direction of thickness in the stator core 10 (the radial direction relative to the motor shaft). Any pair of adjacent in-slot coils 22 must be electrically insulated from each other and from the stator core 10. To this end, an insulating material is formed on the surface 22a of each of the in-slot coils 22 except at the portions to be connected to the inter-slot connecting wires 24.

Each of the inter-slot connecting wires 24 is connected to the end faces of two corresponding in-slot coils 22. The surface 24a of each inter-slot connecting wire 24 is also electrically insulated except at the portions to be connected to the in-slot coils 22.

The connection between the in-slot coil 22 and the inter-slot connecting wire 24 may be accomplished, for example, by such a manner as shown in FIGS. 3A and 3B. As can be seen from these figures, threaded holes 28 (only one shown) are formed through the inter-slot connecting wire 24. A blind threaded hole 30 corresponding to each threaded hole 28 is also formed in the in-slot coil 22. The inter-slot connecting wire 24 is placed on the in-slot coil 22 to engage the upwardly extending projection 32 thereof and to align the threaded holes 28 with the threaded holes 30. Screws 34 are then inserted and screwed into the aligned holes 28 and 30 to fix the inter-slot connecting wire 24 relative to the in-slot coil 22.

Alternatively, the connection between the in-slot coil 22 and the inter-slot connecting wire 24 may be accomplished, for example, by such a manner as shown in FIGS. 4A–4C. In such a case, the inter-slot connecting wire 24 is of a substantially L-shaped cross-section. The inter-slot connecting wire 22 includes threaded holes 28 (only one shown) formed therethrough at the shorter leg of the "L". Threaded holes 30 (only one shown) are also formed through the in-slot coil 22 at positions corresponding to the threaded holes 28. When the inter-slot connecting wire 24 is butted against the in-slot coil 22 to align the threaded holes 28 and 30 with each other, screws 34 are inserted and screwed into the aligned holes 28 and 30 to fix the inter-slot connecting wire 24 relative to the in-slot coil 22. The inter-slot connecting wire 24 has its tapered bottom 24b to provide an enlarged contact area relative to the in-slot coil 22. Such an arrangement improves the electrical connection between the inter-slot connecting wire 24 and the in-slot coil 22, in comparison with the arrangement of FIGS. 3A and 3B.

Figure 5:
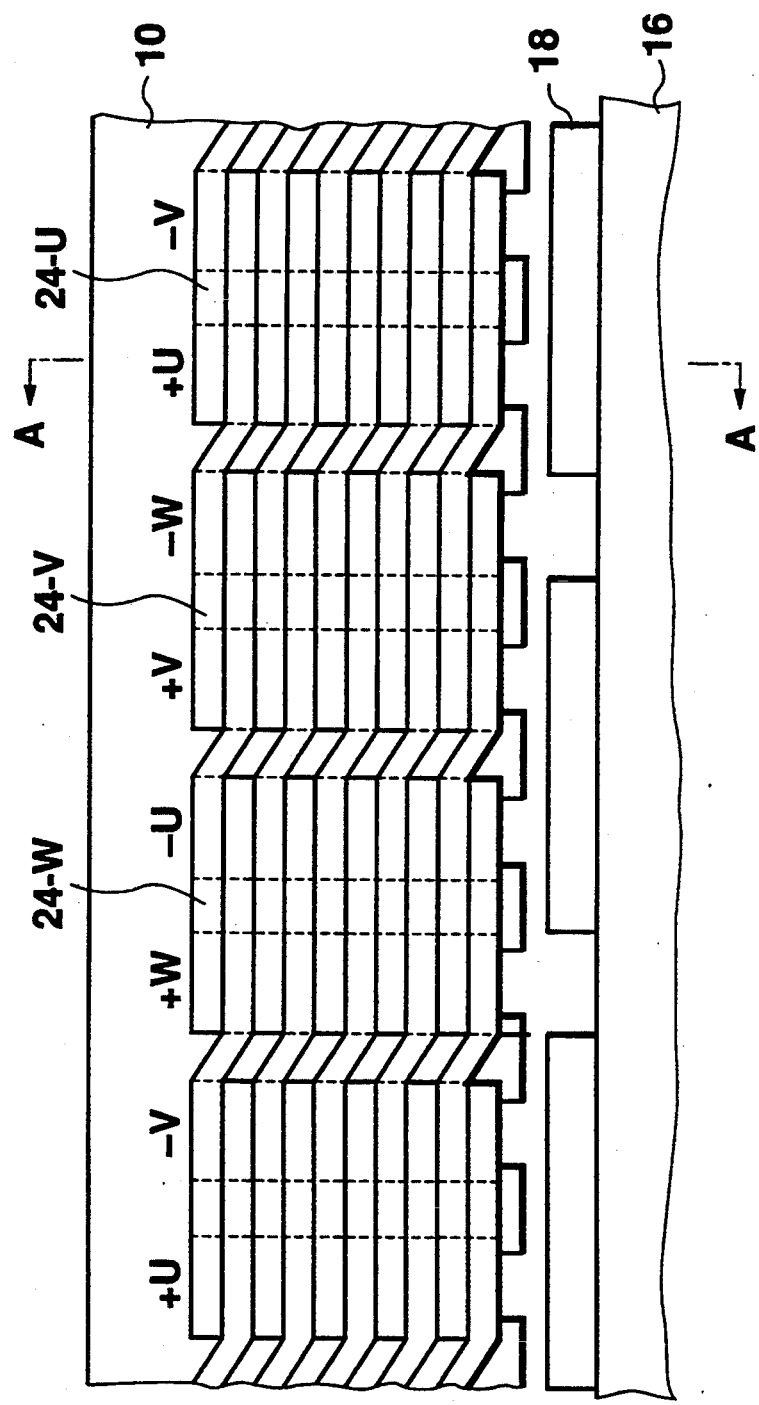
FIG. 5 is a diagrammatic view showing the inter-slot connecting wire structure in the embodiment of FIG. 1.

FIG. 5 shows the layout of the inter-slot connecting wires 24 in the above embodiment. Although the stator core and rotor 10, 16 are linearly drawn in FIG. 5 as in FIG. 9 for simplicity, they are actually of cylindrical configuration.

Each of the inter-slot connecting wires 24-U, 24-V and 24-W in this embodiment is also of a curved bar-shaped configuration, as in FIGS. 1 and 2. By taking such a curved bar-shaped configuration in the inter-slot connecting wires 24, the in-slot coils 22 received in the different slots 14 are electrically connected together to form an entire coil.

As in FIG. 2, the inter-slot connecting wires 24 constituting the same phase are disposed in a manner such that they are spaced away from one another with space intervals. The inter-slot connecting wires 24 constituting other phases are mounted to extend through the spacings. More particularly, the inter-slot connecting wire 24-U, 24-V and 24-W extends through these spacings, as in FIG. 5. In other words, the in-slot coils 22 and inter-slot connecting wires 24 are constructed such that the inter-slot connecting wires 24 of same phase are spaced away from one another to form gaps when the inter-slot connecting wires 24 are connected to the in-slot coils 22. Thus, the inter-slot connecting wires 24-U, 24-V and 24-W are conveniently mounted to extend through the gaps without interference.

Figure 6:
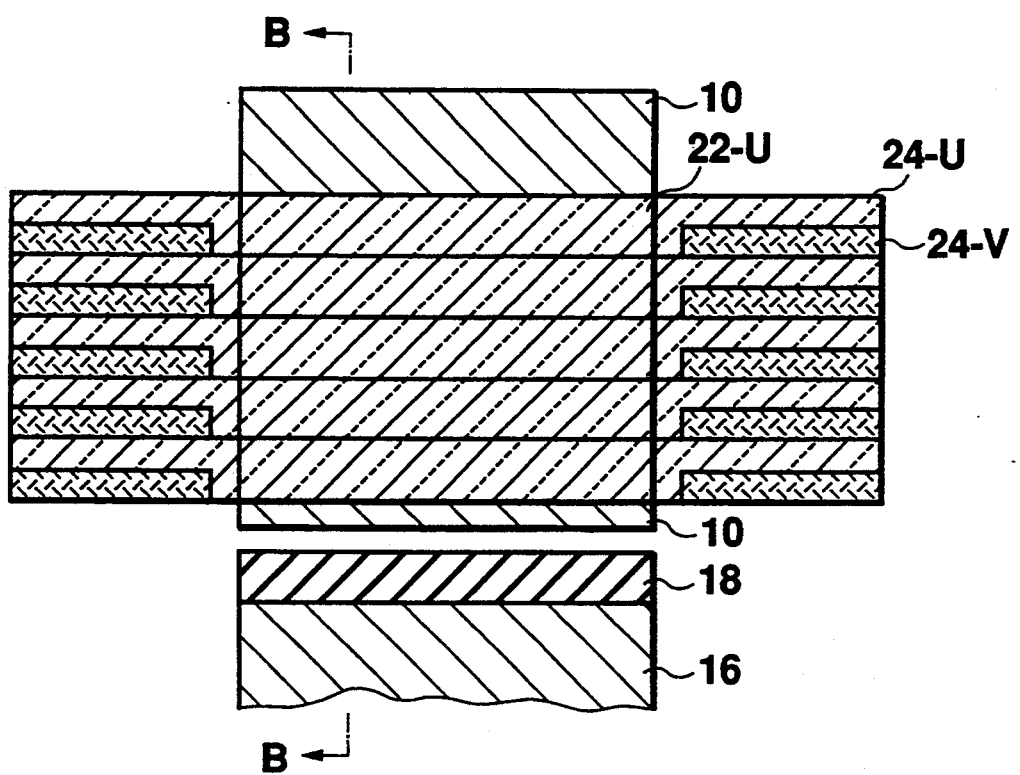
FIG. 6 is an end view showing the positional relationship between the in-slot coils in the same slot in the present embodiment, taken along a line A—A in FIG. 5.
Figure 7:
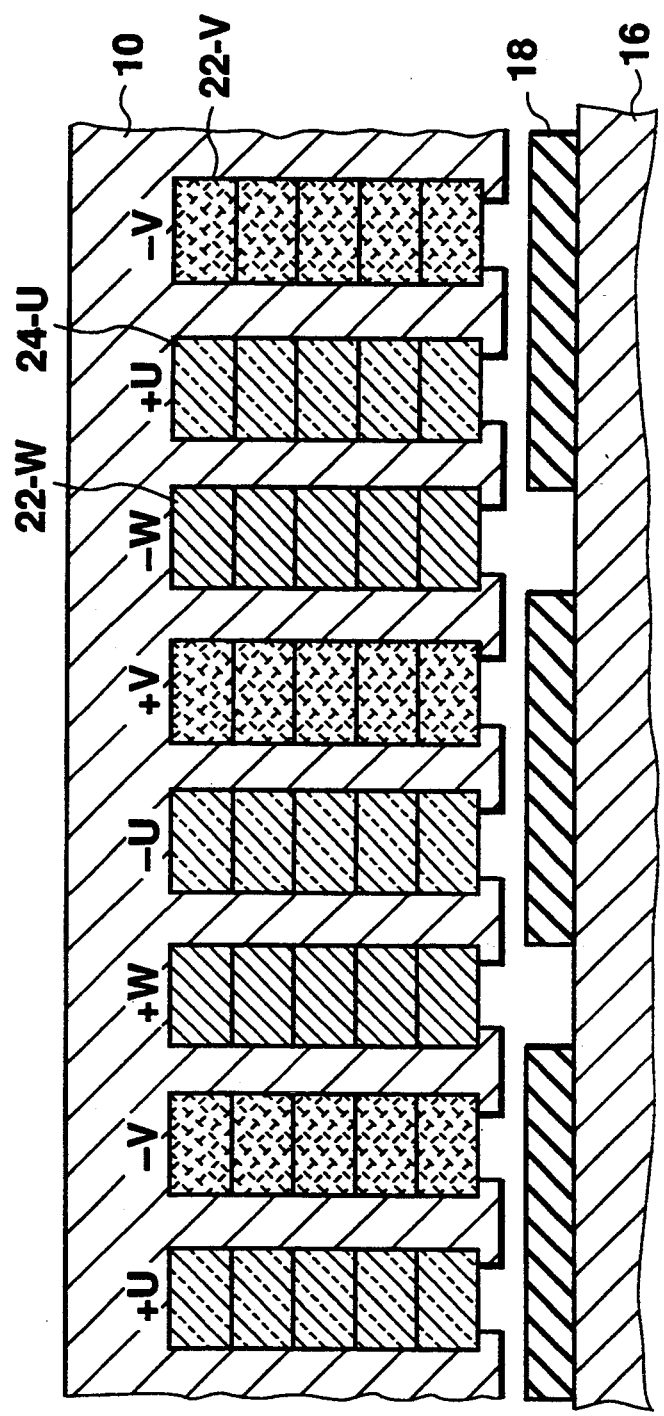
FIG. 7 is a cross-sectional view showing the positional relationship between the inter-slot connecting wires in the present embodiment, taken along a line B—B in FIG. 6.

FIGS. 6 and 7 illustrate the positional relationship between tile in-slot coils in the present embodiment. FIG. 6 is a cross-sectional view taken along a line A—A in FIG. 5 while FIG. 7 is a cross-sectional view taken along a line B—B in FIG. 6. Being compared with FIGS. 10 and 11 which show the prior art, it can be understood that the present embodiment greatly improves the space factor by the use of the laminated in-slot coils 22.

Figure 8:
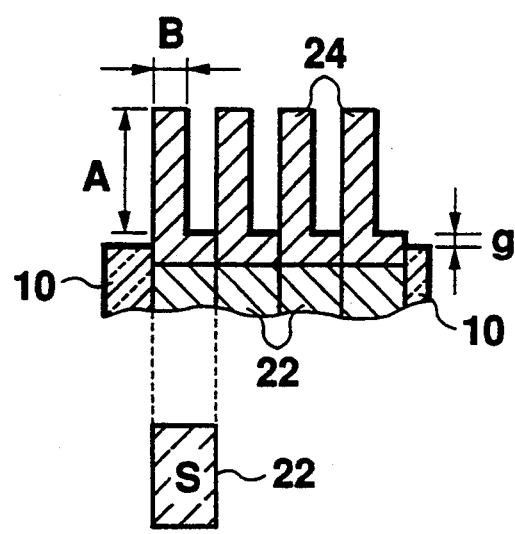
FIG. 8 is a cross-sectional view showing the dimensional arrangement of the inter-slot connecting wires and in-slot coils in the present embodiment.

In the present embodiment, the cross-sectional area of the inter-slot connecting wires 24 individually connecting the inter-slot connecting wires 22 is substantially equal to that of the in-slot coils 22. In other words, the product of width A times thickness B in an inter-slot connecting wire 24 is set to be substantially equal to the cross-sectional areas of an in-slot coil 22, as shown in FIG. 8. Thus, the resistance of the in-slot coil 22 per given length is substantially equal to that of the inter-slot connecting wire 24 per given length. A size shown by g in FIG. 8 is set to a value which is as small as possible. The size of the motor can thus be reduced to be as small as possible.

In the present embodiment, therefore, the space factor ranges between about 90% and about 95%. As a result, a coil structure can be provided which is greatly improved in space factor, in comparison with the prior art which would provide the space factor equal to or less than 50%. Since the coil 20 is formed without wire winding, the number of manufacturing steps can greatly be reduced to decrease the manufacturing cost. Furthermore, the elimination of the wire winding operation reduces the errors in coil impedances from one to another to improve the performance and efficiency of the motor.

When the inter-slot connecting wires 24 are connected to the in-slot coils 22 in such a manner as shown in FIGS. 4A–4C, the contact area is increased to provide a reliable connection. In addition, the configuration of each inter-slot connecting wire 24 shown in FIG. 8 can be reduced in size and at the same time any unbalance between the in-slot coils 20 in each phase can be inhibited to position the inter-slot connecting wires 24 at accurate positions to improve the performance of the motor.

Although the coil structure has been described to be incorporated into the stator, it may similarly be applied to the rotor. The present invention may be applied to either of the inner rotor type or outer rotor type motor. A plurality of in-slot coil 22 arrays may be disposed in one slot 14. The number of phases is not limited in the present invention. To increase the number of phases, the thickness B may be reduced while the length A may correspondingly be increased.

We claim:
1. A motor comprising:
    a core having at least two end faces and a plurality of slots, said slots being formed therein to extend from a first end face to a second end face of the at least two end faces in a manner parallel to one another;

a plurality of in-slot conductors each having two end portions, a given number of said plurality of in-slot conductors being received in each of the slots to be in layers, the in-slot conductors in the same slot being electrically insulated from one another; and inter-slot connecting conductors each having two end portions, the inter-slot connecting conductors being formed separately from the in-slot conductors, each of said inter-slot connecting conductors being located on or adjacent to a corresponding one of the end faces of the core, one end portion of each inter-slot connecting conductor being electrically connected to the end portion of the corresponding in-slot conductor and another end portion of the same inter-slot connecting conductor being electrically connected to the end portion of the other in-slot conductor, thereby electrically connecting the in-slot conductors in different slots to one another through the inter-slot connecting conductor;

wherein each said in-slot conductor is electrically connected to a corresponding in-slot conductor of a non-adjacent slot via one of said inter-slot connecting conductors such that the in-slot conductors of a corresponding pair of slots and inter-slot connecting conductors therebetween each form one of a plurality of windings of the motor; and wherein the inter-slot connecting conductors connecting a pair of in-slot conductors are interlockingly laminated with other inter-slot connecting conductors in a slot depth direction so that each of said windings overlaps without any interference between the windings.

2. A motor as defined in claim 1 wherein said core is a stator core.

3. A motor as defined in claim 1 wherein said in-slot conductors form windings equal in number n with said inter-slot connecting conductors, wherein n is a natural number.

4. A motor as defined in claim 3 wherein any pair of in-slot conductors connected to each other through the inter-slot connecting conductor are received in different slots spaced away from each other by slots equal to n-1 in number.

5. A motor as defined in claim 1 wherein the in-slot conductors are received in the same slot without clearance.

6. A motor as defined in claim i wherein each of said in-slot conductors is of a bar-shaped configuration.

7. A motor as defined in claim 6 wherein each of said in-slot conductors includes a main body and two end portions having a wall thickness smaller than that of said main body, the end portions of the in-slot conductor extending outwardly from the corresponding slot and wherein the main body of each of said in-slot conductors has a wall thickness set such that no clearance will be created in the corresponding slot.

8. A motor as defined in claim 7 wherein the electrical connection between each of said in-slot conductors and the corresponding inter-slot connecting conductor is accomplished in each in-slot conductor at two end portions.

9. A motor as defined in claim 8 wherein the electrical connection between each of said in-slot conductors and the corresponding inter-slot connecting conductor is accomplished by screw means.

10. A motor as defined in claim 6 wherein the two end portions of each inter-slot connecting conductor are of L-shaped cross-section and wherein the electrical connection between each of said in-slot conductors and the corresponding inter-slot connecting conductor are accomplished at the shorter leg of said L-shape.

11. A motor as defined in claim 10 wherein the L-shaped inter-slot connecting conductor has a tapered bottom to enlarge the electrical contact area between it and the corresponding in-slot conductor.

12. A motor as defined in claim 10 wherein the electrical connection between each of said in-slot conductors and the corresponding inter-slot connecting conductor is accomplished by screw means.

13. A motor as defined in claim 1 wherein gaps present in a plurality of said inter-slot connecting conductors are connected to different in-slot conductors in the same slot and wherein the other inter-slot connecting conductors are in said gaps.

14. A motor as defined in claim 1 wherein each of said inter-slot connecting conductors is in the form of a curved bar.

15. A motor as defined In claim 1 wherein the cross-sectional area of each of said in-slot conductors is equal to that of the corresponding inter-slot connecting conductor.

16. A coil structure comprising:

a plurality of in-slot conductors each having two end portions and being disposed to form a plurality of laminates, wherein in-slot conductors defining the same laminate are electrically insulated from one another; and inter-slot connecting conductors each having two end portions, the inter-slot connecting conductors being formed separately from the in-slot connecting conductors, one end portion of each of the inter-slot connecting conductors being electrically connected to the end portions of the in-slot conductors defining a one of said laminates, with the other end portion thereof being electrically connected to the end portions of the in-slot conductors defining another of said laminates;

wherein each said in-slot conductor is electrically connected to a corresponding in-slot conductor of a non-adjacent slot via one of said inter-slot connecting conductors such that the in-slot conductors of a corresponding pair of slots and inter-slot connecting conductors therebetween each form one of a plurality of windings of the motor; and wherein the inter-slot connecting conductors connecting a pair of in-slot conductors are interlockingly laminated with other inter-slot connecting conductors in a slot depth direction so that each of said windings overlaps without any interference between the windings.

* * * * *

UNITED STATES PATENT AND TRADEMARK OFFICE
CERTIFICATE OF CORRECTION

PATENT NO. : 5,422,526
DATED : June 6, 1995
INVENTOR(S) : Yasutomo Kawabata et al It is certified that error appears in the above-indentified patent and that said Letters Patent is hereby corrected as shown below:

IN THE ABSTRACT: Line 6, before "spaced" insert --are--.

| Column | Line | |
|---|---|---|
| 1 | 62 | Change "lying" to --tying--. |
| 3 | 29 | Before "only" insert --the--; after "only" change "required" to --requirement--. |
| 6 | 10 | Change "tile" to --the--. |
| 6 | 13 | Change "Being" to --When--. |
| 6 | 50 | Change "unbalance" to --imbalance--; change "coils 20" to --coils 22--. |
| 7 | 50 | Change "claim i" to --claim 1--. |
| 8 | 29 | Change "In" to --in--. |

Signed and Sealed this

Seventeenth Day of October, 1995

Attest:

BRUCE LEHMAN

Attesting Officer

Commissioner of Patents and Trademarks